United States Patent [19]

Martin, Jr.

[11] Patent Number: 5,109,326

[45] Date of Patent: Apr. 28, 1992

[54] HIGH EFFICIENCY POWER CONVERTING CELL, AND VERSATILE SYSTEM OF SAME

[75] Inventor: Hubert C. Martin, Jr., Temecula, Calif.

[73] Assignee: Unisys Corporation, Blue Bell, Pa.

[21] Appl. No.: 639,461

[22] Filed: Jan. 10, 1991

[51] Int. Cl.$^5$ ............................................. H02M 3/335
[52] U.S. Cl. ...................................... 363/21; 363/97; 323/266
[58] Field of Search ....................... 363/20, 21, 95, 97; 323/266, 355

[56] References Cited

U.S. PATENT DOCUMENTS 3,986,097  10/1976  Woods .
4,189,764   2/1980  Snyder .................................. 363/21
4,866,587   9/1989  Wadlington ...................... 363/21 X Primary Examiner—Steven L. Stephan
Assistant Examiner—Emanuel Todd Voeltz
Attorney, Agent, or Firm—Charles J. Fassbender

[57] ABSTRACT

A DC-DC power converter cell is disclosed which incorporates novel control circuits that operates the cell at efficiencies of 88%. This cell also has control-in and control-out terminals whereby multiple cells are intercoupled to operate in synchronization with each other as a versatile system of cells. Manufacturing cost is reduced by utilizing a simply configured single-turn high-frequency transformer in each cell, and by operating at efficiencies that reduce cooling requirements.

13 Claims, 7 Drawing Sheets

HIGH EFFICIENCY POWER CONVERTING CELL, AND VERSATILE SYSTEM OF SAME

BACKGROUND OF THE INVENTION

This invention relates to the structure and operation of DC—DC power converters.

Basically, a DC—DC power converter has a pair of input terminals for receiving an input voltage at one level, and it has a pair of output terminals on which it generates an output voltage at another level. Such a converter is used in many types of electronic equipment, like digital computers and their peripherals for example, to provide whatever voltages are needed by the circuitry from which the electronic equipment is made.

One very important characteristic of a DC—DC power converter is the efficiency with which it converts the input voltage to the output voltage. Efficiency is defined as $P_o \div P_i$ where $P_i$ is the power into the converter, and $P_o$ is the power out of the converter. Increasing efficiency makes the converter more economical to operate. Increasing efficiency also reduces the manufacturing cost of converter by lowering the need for high power components and high power cooling mechanisms such as fans and heat sinks.

Another important characteristic of a DC—DC power converter is the range of voltages and power levels over which the converter can operate. A wide range of output voltages is desirable since there are many types of electronic equipment which have different operating voltage requirements. Likewise, the power requirements of electronic equipment varies over a wide range. Further, input voltages from a battery power source often range from 12 volts to 50 volts; and input voltages from a rectified A-C power source often range from 160 volts to 300 volts.

Still another important characteristic of a DC—DC power converter is the cost at which it can be manufactured. Here a dilemma occurs because producing a converter which operates over a wide range of input voltage, output voltage, and power levels has required a wide range of components which in turn increases manufacturing cost. For example, multiple transformers having different turns ratios have been used in prior art converters to meet the different input voltage - output voltage requirements. Such multi turn transformers are, however, costly to manufacture.

Several examples of state of the art DC—DC power converters are disclosed in the "Linear Integrated Circuits Databook" by Unitrode Integrated Circuits, Inc. of Merrimack, N.H., 1987. There, the disclosed converters achieve a maximum efficiency of 75%, and they use multiturn transformers to get a desired input voltage to output voltage ratio. See pages 9-173 and 9-168.

Accordingly, a primary object of the invention is to provide a DC—DC power converter having a novel structure which in comparison to the prior art operates at a higher efficiency, operates over a wider range of voltage levels and power levels, and is less expensive to manufacture.

BRIEF SUMMARY OF THE INVENTION

A preferred embodiment of DC—DC power converter is disclosed as a cell which has a pair of input terminals for receiving an input voltage, and a pair of output terminals on which an output voltage is generated from the input voltage. This cell further includes: 1) a primary single turn winding on a magnetic core and a primary transistor which are coupled in series between the input terminals; 2) a secondary single turn winding on the core and a secondary transistor which are coupled in series between the output terminals; 3) a primary control circuit which turns the primary transistor ON and OFF in a cyclic fashion; and 4) a secondary control circuit which turns the secondary transistor On and OFF in a cyclic fashion. Also, the primary control circuit is magnetically coupled to the core, such that it initiates each ON state of the primary transistor in response to a flux decrease in the core caused by the secondary transistor turning OFF; and, the secondary control circuit is magnetically coupled to the core such that it initiates each ON state of the secondary transistor in response to a flux decrease in the core caused by the primary transistor turning OFF. A range of input voltages and output voltages is achieved by ratioing of the ON time of the primary transistor to the ON time of the secondary transistor.

Further, to reduce power loss in the primary and secondary transistors when those transistor switch from ON to OFF, the primary control circuit includes feedback components which lower the gate-source voltage of the primary transistor by a step when the primary transistor starts to turn OFF, and the secondary control circuit includes feedback components which lower the gate-source voltage of the secondary transistor by a step when the secondary transistor starts to turn OFF.

In addition, to reduce power loss in the primary and secondary transistors when those transistors switch from OFF to ON, the primary control circuit includes delay components which delay turning ON the primary transistor until a near zero voltage drop occurs across the primary transistor, and the secondary control circuit includes delay components which delay turning ON the secondary transistor until a near zero voltage drop occurs across the secondary transistor.

Also, the primary control circuit includes a control-out terminal on which a control voltage of a certain level is generated when the primary transistor is ON, and a control-in terminal which inhibits the primary transistor from turning ON when a voltage of the certain level is applied thereto by an external source. This enables a series of the DC—DC power converter cells to operate together as a versatile synchronized system of cells. In this system, each cell has its control-out terminal coupled to the control-in terminal of the next cell in series. All of the cells have their input terminals and output terminals coupled either in series or in parallel to thereby obtain a wide range of operation for the input voltage, output voltage and power levels.

With this invention efficiencies of 88% have been reached. Also with this invention, any input voltage can be converted to any output voltage at any power level by combining a number of the cells in the proper series-parallel configuration. Further with this invention, manufacturing cost is reduced since only a simple single turn transformer is needed regardless of the operating input and output voltages. Also, high power cooling mechanisms are not needed due to the high operating efficiency of each cell, and large output capacitors are not needed since the synchronized operation of the cells reduce ripple.

BRIEF DESCRIPTION OF THE FIGURES

Several preferred embodiments of the invention, along with their features and advantages, are described herein in conjunction with the accompanying drawings wherein.

DETAILED DESCRIPTION

Figure 1:
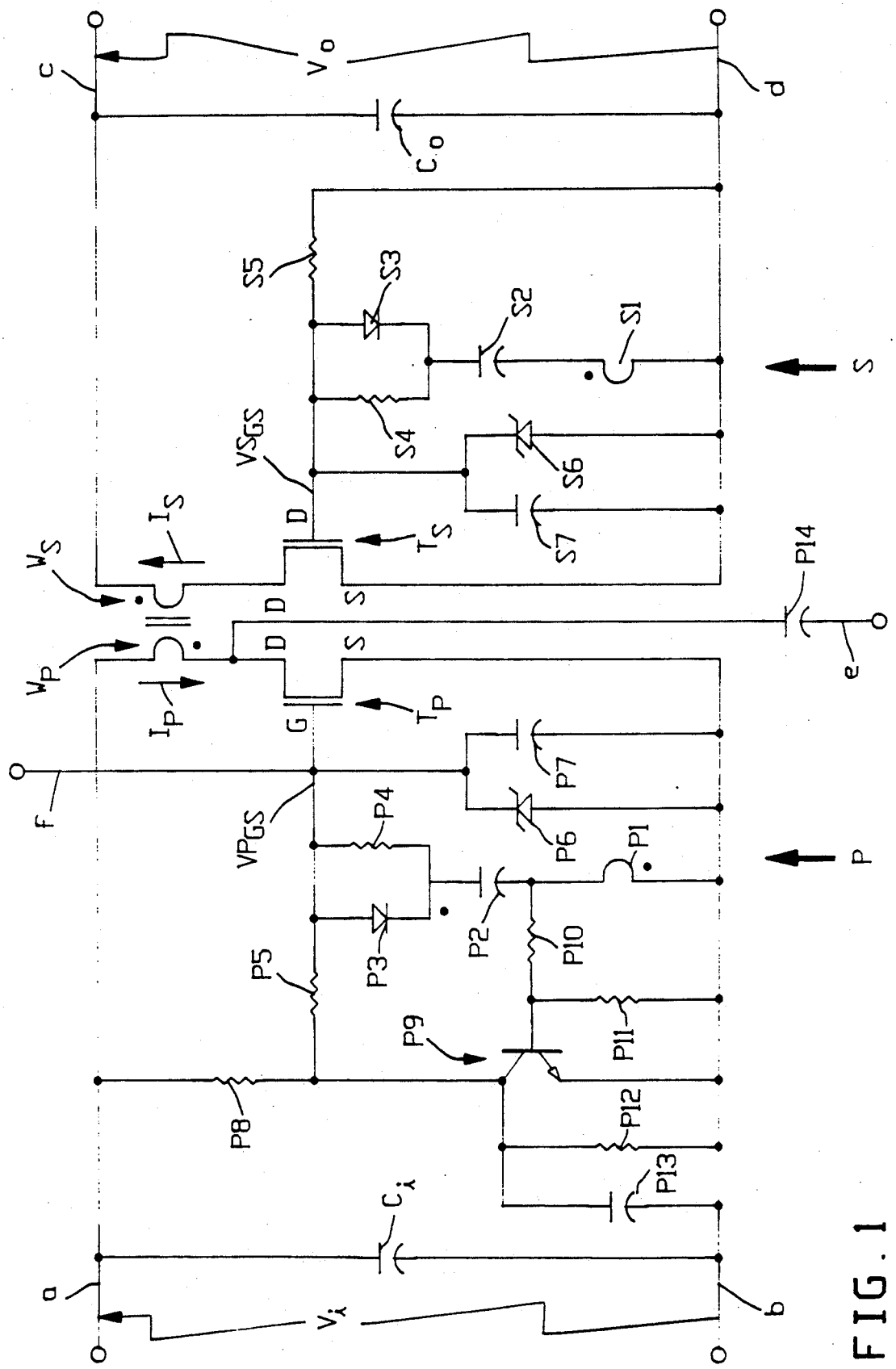
FIG. 1 is a detailed circuit diagram of one preferred embodiment of a DC—DC power converter cell.

Referring to FIG. 1, a preferred embodiment of a DC—DC power converter cell which is constructed according to the present invention will be described. This cell has a primary section P and a secondary section S. Section P includes all of the components in FIG. 1 which are labelled $W_P$, $T_P$, P1 through P14, and $C_i$. Section S includes all of the remaining components which are labelled $W_S$, $T_S$, S1 through S7, and $C_o$.

Components $W_P$ and $W_S$ respectively are a single turn primary winding and a single turn secondary winding of a transformer which has a common core. In FIG. 1, the core is schematically indicated by the two vertical lines between the windings $W_P$ and $W_S$. Preferably, the core is made of a material having a high magnetic permeability such as iron.

Component $T_P$ is an N-Channel field effect power transistor which has a source S and drain D connected in a series with the primary winding $W_P$. Those serially connected components $T_P$ and $W_P$ have input terminals "a" and "b" for receiving an external DC voltage $V_i$ which is to be converted to a DC output voltage $V_o$.

To switch transistor $T_P$ ON and OFF, components P1–P14 are provided. Component P1 is a single turn sense winding on the common core of the transformer having windings $W_P$ and $W_S$; component P2 is a capacitor; component P3 is a diode; components P4 and P5 are resistors; component P6 is a Zener diode; component P7 is a capacitor; component P8 is a resistor; component P9 is a bipolar transistor; components P10–P12 are resistors; and components P13, P14, and $C_i$ are capacitors. All of these components are interconnected as shown in FIG. 1.

In the secondary section, component $T_S$ is an N-Channel field effect power transistor which has a source S and drain D connected in series with the secondary winding $W_S$. Those serially connected components $T_S$ and $W_S$ have output terminals "c" and "d" across which the D-C output voltage $V_o$, is developed.

To switch transistor $T_S$ ON and OFF, components S1–S7 are provided. Component S1 is another single turn sense winding on the transformer,s common core; component S2 is a capacitor; component S3 is a diode; components S4 and S5 are resistors; component S6 is a Zener diode; and component S7 is a capacitor. Also, component $C_o$ is a capacitor, which holds the output voltage $V_o$. All of these components are interconnected as shown.

In operation, transistor $T_P$ is turned ON during spaced apart time intervals; and, transistor $T_S$ is turned ON between those time intervals. In other words, transistor $T_p$ is ON when transistor $T_S$ is OFF, and vice versa. To switch transistor $T_P$ ON and OFF, components P1–P14 generate a control signal $VP_{GS}$ on the gate G of transistor $T_P$; and, to switch transistor $T_S$ ON and OFF, components S1–S7 generate a control signal $VS_{GS}$ on the gate G of transistor $T_S$.

By the above synchronized ON-OFF switching of transistors $T_P$ and $T_S$, the DC output voltage $V_o$ is derived from the input voltage $V_i$. To a first order approximation, $V_o = V_i(t_P/t_S)$ where $t_P$ and $t_S$ are the respective ON times of transistors $T_P$ and $T_S$. Thus, the output voltage is made larger than the input voltage by making $t_p$ larger than $t_s$; and vice-versa. One practical range for the parameter $t_p$ and $t_s$ is: $0.25 \leq t_p/t_s \leq 4.0$.

Figure 2:
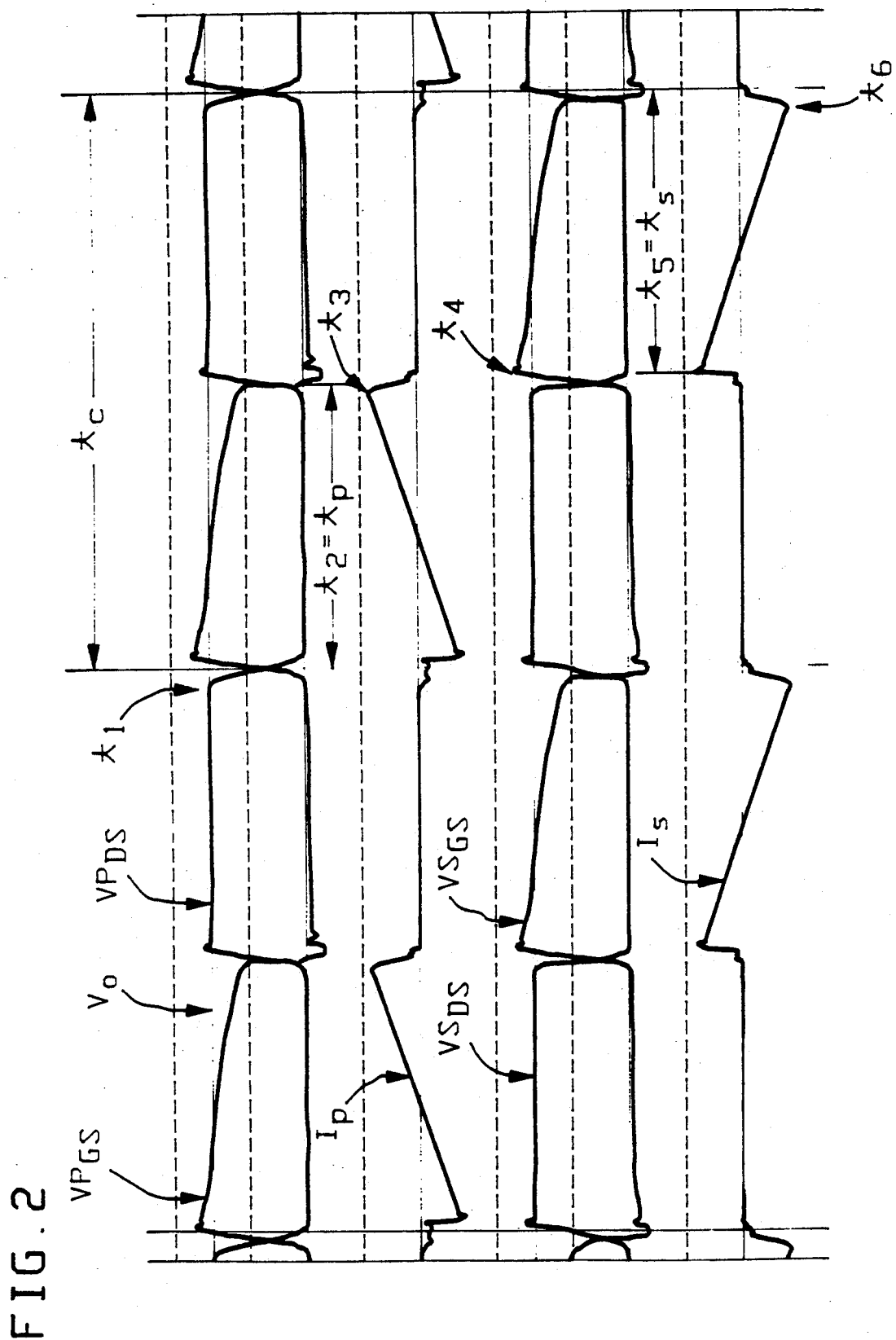
FIG. 2 shows a set of voltage waveforms and current waveforms which occur at various locations in the FIG. 1 cell.

To explain how the above switching occurs in the FIG. 1 power cell, a set of voltage waveforms is provided in FIG. 2. These waveforms were obtained by simulating the operation of the FIG. 1 converter on a digital computer. Component values which were used in this simulation are given in Table 1 below.

TABLE 1

| | | | |
|---|---|---|---|
| $T_p =$ | Motorola NTP60N05 | $T_s =$ | Motorola NTP60N05 |
| P2 = | 3000 picofarads | S2 = | 3000 picofarads |
| P3 = | UF4004 | S3 = | UF4004 |
| P4 = | 3 ohms | S4 = | 3 ohms |
| P5 = | 120 ohms | S5 = | 120 ohms |
| P6 = | 1N758 | S6 = | 1N758 |
| P7 = | 5000 picofarads | S7 = | 5000 picofarads |
| P8 = | 1000 ohms | $C_o =$ | 20 microfarads |
| P9 = | 2N222 | | |
| P10 = | 2000 ohms | | |
| P11 = | 500 ohms | | |
| P12 = | 500 ohms | | |
| P13 = | 0.01 microfarads | | |
| P14 = | 1000 picofarads | | |
| $C_i =$ | 20 microfarads | | |

In FIG. 2, a waveform $V_O$ shows the output voltage; waveform $VP_{DS}$ shows the drain-source voltage of transistor $T_P$; waveform $VP_{GS}$ shows the gate-source voltage of transistor $T_P$; waveform $I_P$ shows the current through transistor $T_P$; waveform $VS_{DS}$ shows the drain-source voltage of transistor $T_S$; waveform $VS_{GS}$ shows the gate-source voltage of transistor $T_S$; and waveform $I_S$ shows the current through transistor $T_S$. On the vertical axis, the above waveforms are scaled as follows: $V_O = 10$ volts/division, $VP_{DS} = VS_{DS} = 20$ volts/division, $VP_{GS} = VS_{GS} = 5$ volts/division, and $I_P = I_S = 10$ amps/division. On the horizontal axis, the cycle time $t_c$ is 907 nanoseconds.

To start the FIG. 1 power cell operating, a D-C input voltage $V_i$ is applied across the input terminals "a" and "b". In the FIG. 2 simulation, this input voltage was fifteen volts. When the input voltage $V_i$ is initially applied, transistors $T_P$ and $T_S$ are both OFF, and the currents $I_P$ and $I_S$ are both zero. Under those conditions, the D-C input voltage $V_i$ will charge capacitor P13 and forward bias the gate-source of transistor $T_P$ by means of resistors P8 and P5. Thus transistor $T_P$ turns ON. This initiates a cyclic ON-OFF switching of the transistors $T_P$ and $T_S$, which after several cycles reaches the steady-state shown in FIG. 2.

When transistor $T_P$ turns ON, its drain-source voltage steps down to zero volts. One such step occurs in FIG. 2 at time $t_1$. Since the sum of the voltages across components $T_P$ and must equal the input voltage, the voltage across winding $W_P$ steps up to the input voltage $V_i$ with the undotted terminal being positive. Also, due to magnetic coupling, the voltage across windings $W_S$, P1 and S1 step up to the voltage $V_i$ with the undotted terminals being positive.

In response to the undotted terminal of winding P1 being stepped to a positive voltage, the gate-source voltage of transistor $T_P$ (i.e. - signal $VP_{GS}$) is increased; and, that maintains transistor $T_P$ in an ON state. This gate-source voltage is limited by the reverse voltage drop across Zener diode P6.

Conversely, due to the undotted terminal of winding S1 being stepped to a positive voltage, the gate-source voltage of transistor $T_S$ (i.e. signal $VS_{GS}$) goes negative. That maintains transistor $T_S$ in an OFF state. This gate-source voltage is limited to the forward voltage drop across Zener diode S6; and, the remainder of the winding S1 voltage is stored on capacitor S2. Note that since transistor $T_S$ is OFF, the positive voltage on the undotted terminal of the winding $W_s$ does not effect the output voltage $V_o$.

While transistor $T_P$ is in an ON state, a current $I_P$ flows through the winding $W_P$; and, that current $I_P$ increases in magnitude at a constant rate. Such a current flow occurs because the voltage drop across the winding $W_P$ equals the self inductance of winding $W_P$ times $dI_P/dt$, which in turn must equal the input voltage $V_i$. This occurs during time period $t_2$ (which is the same as time period $t_P$).

As the current $I_P$ increases, another event occurs to limit its peak value. Specifically, transistor P9 turns ON since its base-emitter is forward biased by the positive voltage on the undotted terminal of winding P1. Thus the gate-source voltage of transistor $T_P$ discharges through components P4, P5, and P9. This discharge occurs at a rate which is increased by decreasing the resistance of resistor P5, and vice-versa.

When the gate-source voltage of transistor $T_P$ falls to the transistor's threshold voltage level, transistor $T_P$ starts to turn OFF, and the current through winding $W_P$ starts to decrease. This occurs at time $t_3$. Since the current $I_P$ decreases, $dI_P/dt$ is negative. Thus the $dI_P/dt$ voltage drop across winding $W_P$ reverses polarity. This puts a positive voltage on the dotted terminal of winding $W_P$. Due to magnetic coupling, a positive voltage also is induced on dotted terminal of the winding P1, $W_S$, and S1.

In response to the dotted terminal of winding P1 going positive, the gate-source voltage of transistor $T_P$ goes negative, and thus transistor $T_P$ turns completely OFF very quickly. By comparison, an opposite effect occurs when the voltage on the dotted terminal of winding S1 goes positive. Inducing a positive voltage on the dotted terminal of winding S1 causes the gate-source voltage of transistor $T_S$ to go positive. Consequently, transistor $T_S$ starts to turn ON. This occurs at time $t_4$.

While transistor $T_S$ is ON, its drain-source voltage is reduced to zero, and a current $I_s$ flows through the winding $W_S$. Current $I_s$ is magnetically induced by the stopping of current $I_P$ through the winding P1. This is an application of Lenz's law which says that whenever there is a change in magnetic flux in a circuit, an induced electromotive force is set up tending to produce a current in a direction which will oppose the flux change.

Current $I_S$ starts at a positive initial value, and it decreases therefrom at a constant rate. Such a constant negative $dI_S/dt$ produces a constant voltage $V_i$ across the winding $W_S$ with the dotted terminal being positive. This occurs during time period $t_5$ (which is the same as time period $t_S$).

When the voltage on the dotted terminal of winding $W_S$ switches to the output voltage $V_o$, the voltage on the dotted terminals of windings S1, $W_P$, and P1 also switch to the output voltage $V_i$ due to magnetic coupling. Due to this $V_o$ voltage on the dotted terminal of winding S1, the gate voltage of transistor $T_S$ is raised to the reverse voltage of Zener diode S6, and that holds transistor $T_S$ in an ON state. Conversely, due to the $V_o$ voltage on the dotted terminal of winding P1, transistor $T_P$ is held in an OFF state.

Thereafter, capacitor S2 discharges through resistors S4 and S5. This discharge occurs at a rate which is increased by decreasing the resistance of resistor S5, and vice-versa. When the gate-source voltage of transistor $T_S$ reaches the transistor's threshold voltage, transistor $T_P$ starts to turn OFF. Then the current $I_S$ starts to decrease in magnitude and $dI_S/dt$ goes positive. This occurs at time t6.

In response to $dI_S/dt$ switching from negative to positve, the voltage across transformer winding $W_S$ reverses polarity.

Thus the undotted terminal of winding $W_S$ goes positive. Due to magnetic coupling, the undotted terminals of windings S1, P1, and W1 also go positive. Switching to a positive voltage on the undotted terminal of winding S1 steps down the gatesource voltage of transistor $T_S$; and, consequently, transistor $T_S$ quickly turns completely off. Also, switching to positive voltage on the undotted terminal of winding $W_S$ raises the gate to source voltage of transistor $T_P$, so transistor $T_P$ turns back ON.

Then, the entire $t_1$–$t_6$ sequence is repeated. That is, when transistor $T_P$ turns on, its drain-source voltage goes to zero; then the voltage across winding $W_P$ steps up to the input voltage $V_i$ with the undotted terminal being positive; then due to magnetic coupling, the voltage across windings $W_S$, P1, and S1 step up to the input voltage $V_i$ with the undotted terminals being positive; etc.

Note that each time the voltage on the undotted terminal of winding P1 goes positive, transistor P9 turns on; and that discharges capacitor P13. This discharging occurs so frequently that capacitor P13 never has time to charge through resistor P8 and turn ON transistor $T_P$, except for the initial start up sequence.

One primary feature of the above described FIG. 1 power cell is that it operates at a high efficiency (i.e. its power losses are low). In simulating the operation of the FIG. 1 power cell, efficiencies of 88% were reached. This efficiency is achieved by the manner in which the transistors $T_P$ and $T_S$ are switched from ON to OFF and from OFF to ON.

Specifically, when transistor $T_P$ starts to turn OFF, a flux decrease occurs in winding $W_P$ which in turn changes the polarity of the voltage on the undotted terminal of winding P1 from negative to positive. That winding P1 voltage change then quickly lowers the gate-source voltage of transistor $T_P$ by a step through components P6, P3, and P2. Thus, components P6, P3, and P2 in conjunction with the winding P1 operate as a positive feedback circuit which quickly turn transistor $T_P$ completely OFF as soon as transistor $T_P$ begins to turn OFF.

By this quick turn OFF, the current $I_P$ through the transistor $T_P$ is reduced to zero before the drain-source voltage of transistor $T_P$ can increase from its ON level of zero volts to any appreciable level. This greatly minimizes power loss in the transistor $T_P$ since power at any time instant is the product of the transistor's instantaneous drain-source voltage times its instantaneous current $I_P$.

Figure 3:
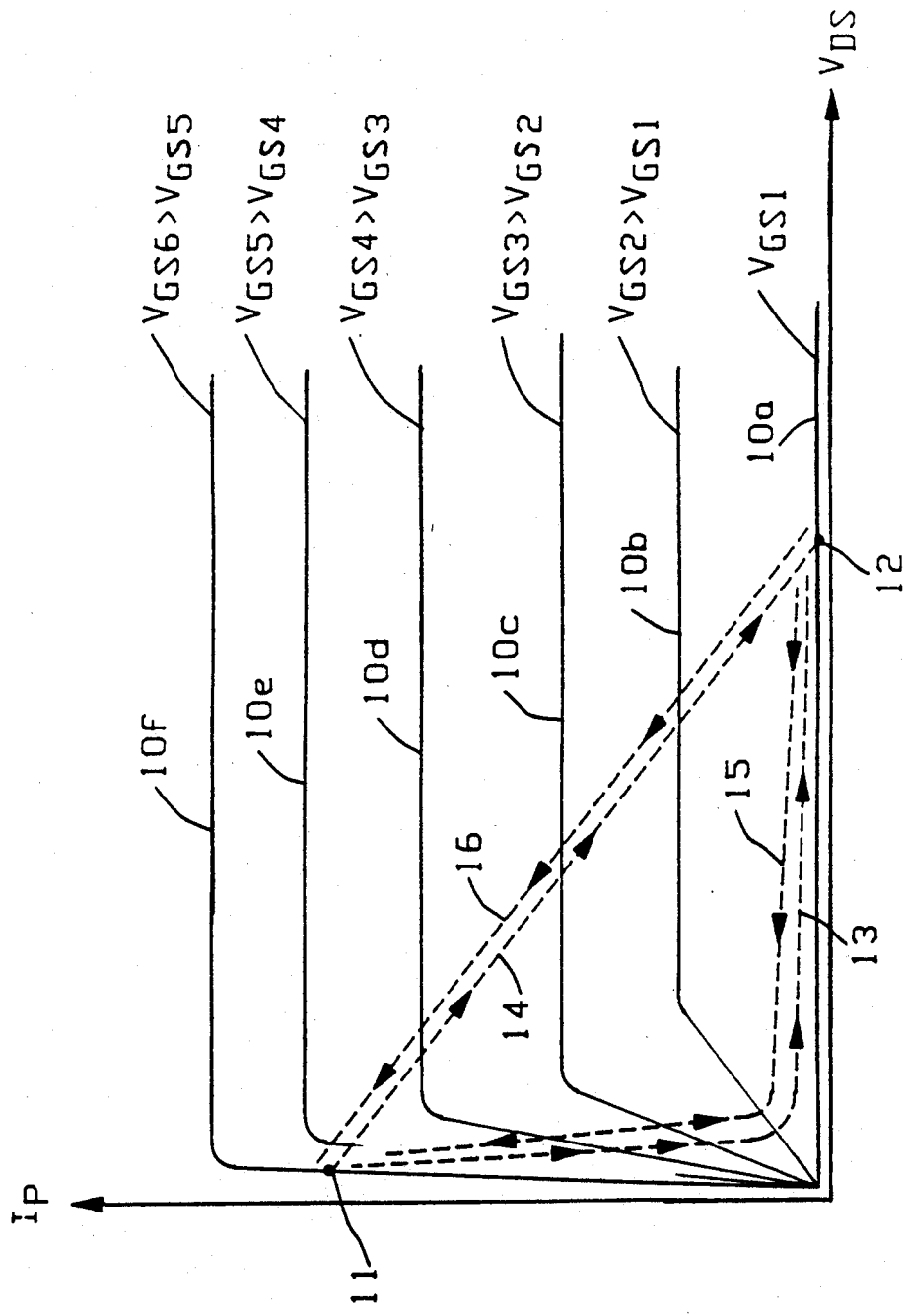
FIG. 3 is a plot which shows how certain transistors in the FIG. 1 cell switch their current and voltage to achieve a high efficiency.

FIG. 3 shows the above described ON to OFF switching in a graphic form. In FIG. 3, the drain to source voltage of transistor $T_P$ is plotted on the horizontal axis and the current $I_P$ of transistor $T_P$ is plotted on the vertical axis. These parameters $V_{DS}$ and $I_P$ are related by a set of curves 10a through 10f which are a function of the transistor's gate to source voltage as shown.

In its ON state, transistor $T_P$ operates at point 11 in FIG. 3; whereas in its OFF state, transistor $T_P$ operates at point 12. When transistor $T_P$ switches from its ON to its OFF state, it does along the path 13 because the current through the transistor is reduced to zero very quickly. At all points on that path, either the current $I_P$ or the voltage $V_{DS}$ is near zero, and thus the power dissipation at all points on that path are near zero. By comparison, if transistor $T_P$ turned OFF slowly, then it would switch from the ON state to the OFF state on the different path, such as path 14, on which the transistor's current and voltage simultaneously have values which are substantially greater than zero.

In like manner, when transistor $T_S$ of the secondary switches from the ON to OFF, it also dissipates only a small amount of power. This is due to the symmetry in the structure and operation of the primary and secondary sections P and S. When transistor $T_S$ starts to turn OFF, a flux decrease occurs in winding $W_S$ which in turn changes the polarity of the voltage on the undotted terminal of winding S1 from negative to positive; and, that winding S1 voltage change then lowers the gate-source voltage of transistor $T_S$ by a step by means of components S6, S3, and S2.

Further, when transistor $T_P$ and $T_S$ switch from an ON state to an OFF state, they do so by following a path 15 in FIG. 3. Along path 15, either the voltage or the current is always near zero, and thus power loss in the ON to OFF transition of transistors $T_P$ and $T_S$ is near zero.

In order to operate on the path 15, the drain-source voltage of transistors $T_P$ and $T_S$ must be reduced to nearly zero volts before those transistors are turned ON. If those transistors are turned ON before their drain-source voltage is reduced to zero, they will be operating along another path, such as path 16, on which the voltage and the current have substantial non-zero values at the same time; and that results in a high power loss.

Before transistor $T_S$ is OFF (i.e. during the time period $t_2$), its drain-source voltage equals $W_o$ plus $V_i$. Then at time $t_3$, transistor $T_P$ starts to turn OFF. In response $dI_P/dt$ changes from a constant positive value to a negative value; thus the polarity of the voltage across the winding $W_P$ reverses polarity; and due to magnetic coupling are similar seversal occurs in the polarity of the voltage across the windings $W_S$ and S1. In response to the polarity change across he winding S1, transistor $T_S$ turns on; however, the time at which that turn ON occurs is delayed by the presence of capacitor S7 and resistor S4. These components are sized such that the gate to source voltage of transistor $T_S$ rises to its threshold level at the instant when the voltage on the dotted terminal of winding $W_S$ reaches the output voltage.

Due to symmetry, transistor $T_P$ in the primary section switches from an OFF state to an ON state in a similar fashion. During time period $t_5$, transistor $T_P$ is OFF and its drain-source voltage equals $V_O$ plus $V_i$. Then at time $t_6$, transistor $T_S$ starts to turn OFF. In response, current $I_S$ starts to decrease and so $dI_S/dt$ goes negative. Thus the voltage across winding $W_S$ changes polarity; and due to magnetic coupling, the voltage across the windings $W_P$ and P1 also change polarity. This polarity change on the winding P1 causes transistor $T_P$ to turn ON; however, the time at which the turn on occurs is delayed by the presence of capacitor P7 and resistor P4. These components are sized such that the threshold voltage of transistor $t_P$ is reached at the instant when the voltage across winding $W_P$ reverses polarity and reaches the input voltage $V_i$.

Another feature of the above described power cell is that since the ON to OFF and OFF to ON power loss in the transistors $T_P$ and $T_S$ is small, the number of times that those transistors switch per second can be in the megacycle range without causing those transistors to heat up and require expensive cooling mechanisms. Preferably, the ON-OFF cycle of transistors $T_P$ and $T_S$ lasts between one hundred nanoseconds and one and one-half microseconds.

To obtain a particular operating frequency, resistors P5 and S5 are adjusted. Increasing resistor P5 increases the ON time of transistor $T_P$, and vice versa. Increasing resistor S5 increases the ON time of transistor $T_S$, and vice versa.

By operating in the above preferred frequency range, the maximum flux in the magnetic core is kept small. This is because flux is proportional to current, and the current in the windings $W_P$ and $W_S$ is ramp shaped. Thus, reducing the time period during which the current in the windings $W_P$ and $W_S$ ramps up directly reduces the core's maximum magnetic flux.

Having the maximum magnetic flux be small is important because it reduces the size of the core, and that reduces the cost of the materials that are needed to make the core. Flux in the core is equal to flux density times the cores cross sectional area. Flux density is limited by the material from which the core is made. Thus, any increase in the core's maximum flux requires an increase in the cores size, which increases cost.

Figure 4:
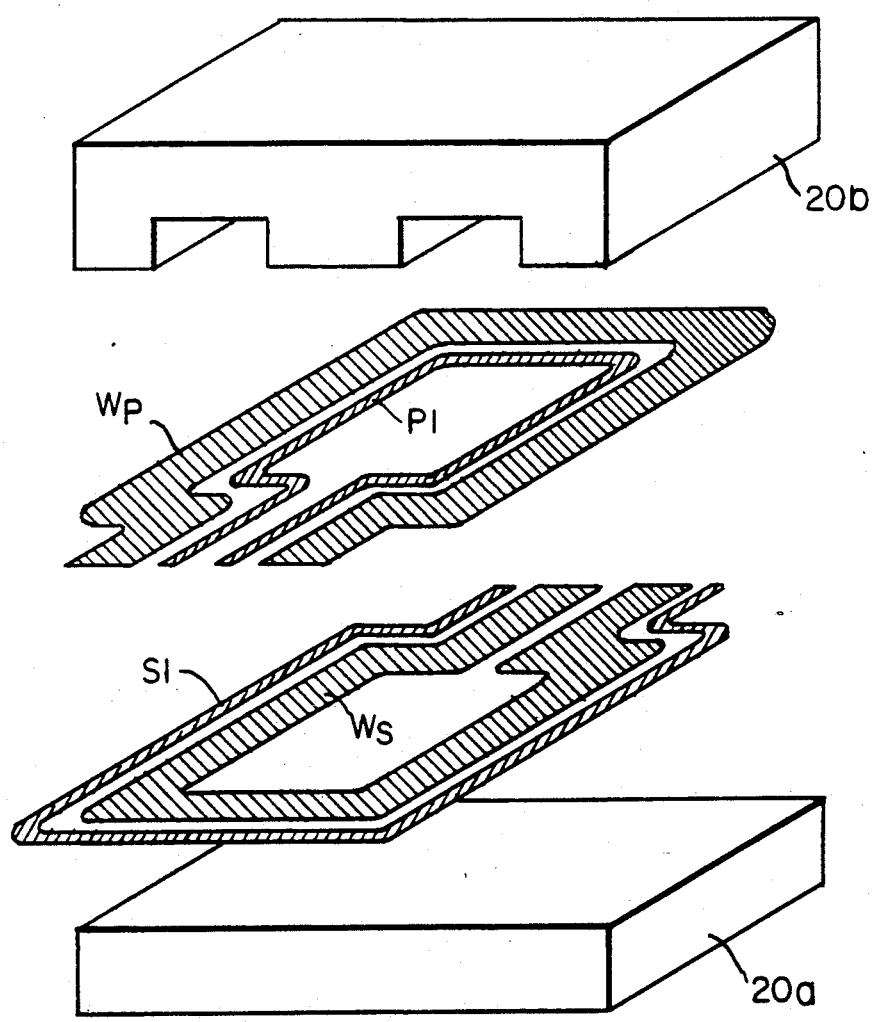
FIG. 4 is an exploded view of a single turn transformer which is used in the FIG. 1 cell.

Still another feature of the above described power cell is that all of the core windings have just a single turn; and, that further simplifies the structure of the converter and its cost. Details of one preferred structure for the core and its windings $W_P$, $W_P$, P1, and S1 are shown in FIG. 4. There, the core has a rectangular base member 20a and an E shaped top member 20b. Windings $W_P$ and P1 are patterned as shown from a thin sheet of copper which is covered by an insulating layer; and windings $W_S$ and S1 are patterned as shown from another thin sheet of copper which is covered by an insulating layer. This two layer planar structure for the windings is much simpler and inexpensive then the structure of a multi-turn transformer.

Another feature of the FIG. 4 core-winding structure is that a high degree of magnetic coupling (i.e. greater than 95%) occurs between all of the windings. This is achieved by making winding $W_P$ be wide enough to overlap both of the windings $W_S$ and S1, and by making winding $W_S$ be wide enough to overlap both of the windings $W_P$ and P1. Such a high degree of coupling between all of the windings is required in order for the switching of transistors $T_P$ and $T_S$ to occur with the timing described in conjunction with FIGS. 2 & 3.

Yet another feature of the above described power cell is that it has a control-out terminal "e" and a control-in terminal "f" by which multiple cells are synchronized with each other as one power conversion system. This feature is illustrated in FIGS. 5A–5D.

Figure 5A:
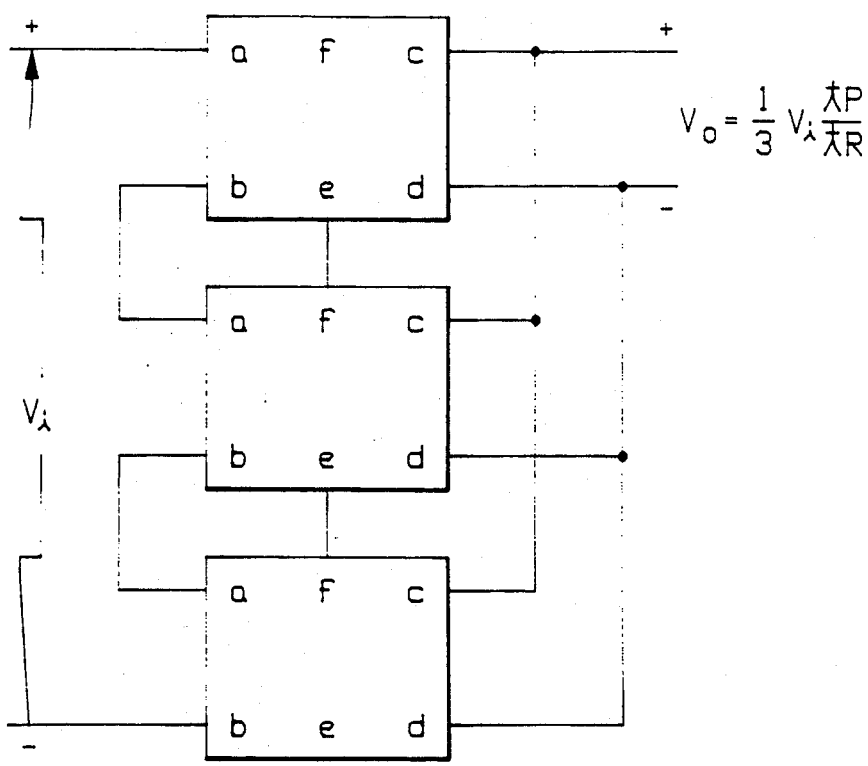
FIGS. 5A–5D show four preferred power converter systems which are made from different combinations of the FIG. 1 cell; and, FIG. 6 is a set of voltage waveforms which show how the cells within the FIGS. 5A–5D systems operate in time with respect to one another.

In the FIG. 5A power conversion system, there are three power cells 30a, 30b, and 30c. Each of those cells has the previously described FIG. 1 structure. Cell 30a has its control-out terminal "e" connected to the control-in terminal "f" of cell 30b; and, cell 30b has its control-out terminal "e" connected to the control-in terminal "f" of cell 30c. Also in FIG. 5A, the voltage input terminals "a" and "b" of cells 30a, 30b, and 30c are connected in series, and the voltage output terminals "c" and "d" are connected in parallel. With this FIG. 5A power conversion system, the output voltage $V_o$ is made equal to $\frac{1}{3} V_i (t_P/t_S)$. By modifying the FIG. 5A system to have N cells, the output voltage is made equal to $1/N\ V_i (t_P/t_S)$.

Figure 5B:
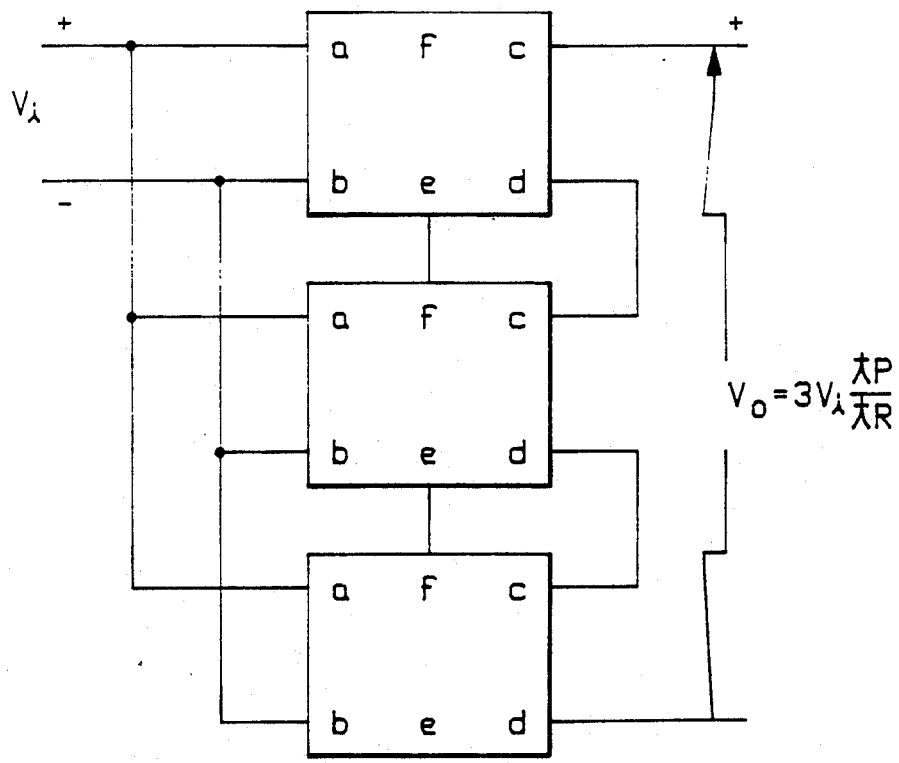

In the FIG. 5B power conversion system, there again are three of the FIG. 1 power cells 30a, 30b, and 30c; and, the control-out terminals "e" and the control-in terminals "f" are again interconnected in series. However, in FIG. 5B, the voltage input terminals "a" and "b" of all the cells are connected in parallel, and the voltage output terminals "c" and "d" of all of the cells are connected in series. With this FIG. 5B system, the output voltage $V_o$ is made equal to $3\ V_i(t_P/t_S)$. By modifying the FIG. 5B system to have N cells; the output voltage is made equal to $N\ V_i (t_P/t_S)$.

Figure 5C:
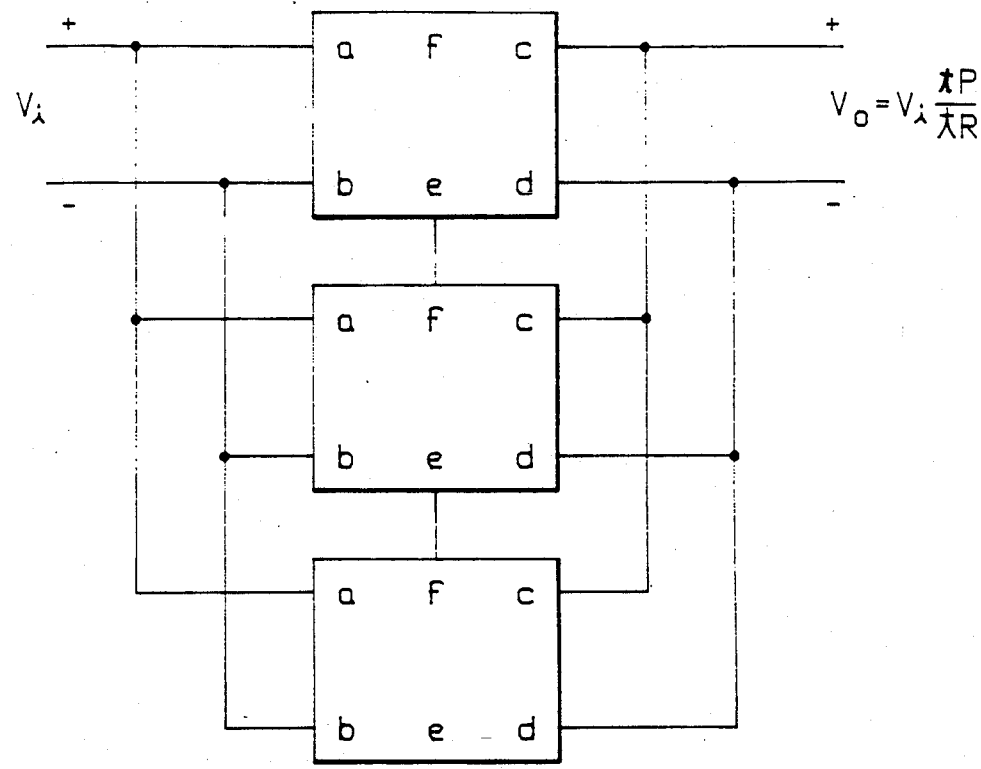

In the FIG. 5C power conversion system, there again are three of the FIG. 1 power cells 30a, 30b, and 30c which have their control-out terminals "e" and control-in terminals "f" interconnected in series. However, in the FIG. 5C system, all the cells have their voltage input terminals "a" and "b" connected in parallel, and they have their voltage output terminals "c" and "d" connected in parallel. With this FIG. 5C system, the output voltage $V_o$ is equal to $V_i(t_P/t_S)$; and, the maximum power that can be converted is three times the maximum power that can be converted with a single cell. By modifying the FIG. 5C system to have N cells, the total power which can be converted is N times that which can be converted by a single cell.

Figure 5D:
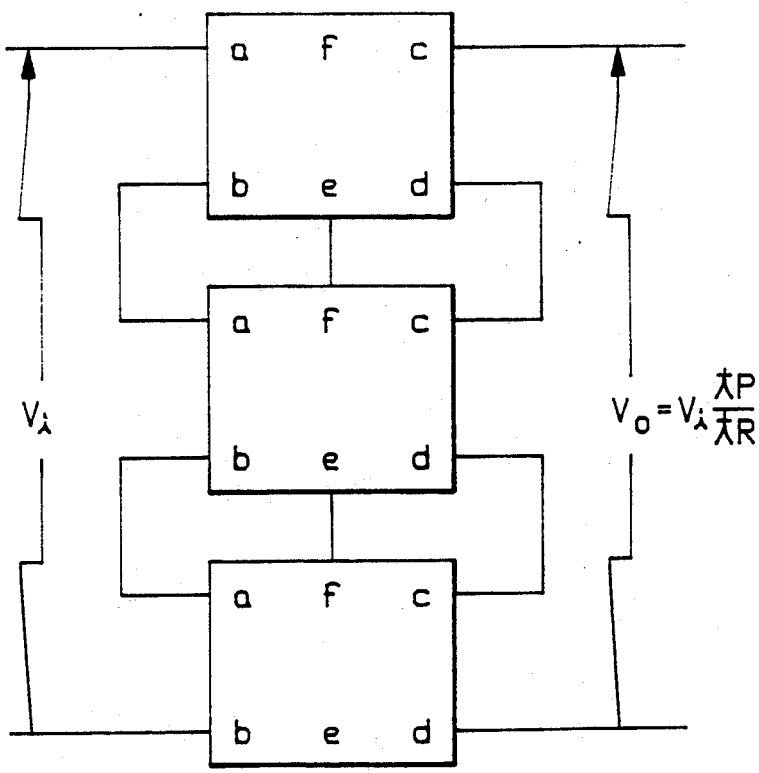

In the FIG. 5D power conversion system, there again are three of the FIG. 1 power cells 30a, 30b, and 30c which have their control-out terminals "e" and control-in terminals "f" interconnected in series. However, in FIG. 5D system the voltage input terminals "a" and "b" of all of the cells are connected in series, and the voltage output terminals "c" and "d" are also connected in series. With the system, the output voltage $V_o$ is equal to $V_i(t_P/t_S)$; and, the maximum input voltage and maximum output voltage is increased by a factor of three over the breakdown voltage of any of the components in the individual cells. For example, if the breakdown voltage of the primary transistor $T_P$ and secondary transistor $T_S$ is 60 volts, then the FIG. 5 system can operate with a $V_i$ and $V_o$ of up to 180 volts before those transistors breakdown. By modifying the FIG. 5D system to have N cells, the input voltage and output voltage can reach N times the breakdown voltage of the components of the individual cells.

Figure 6:
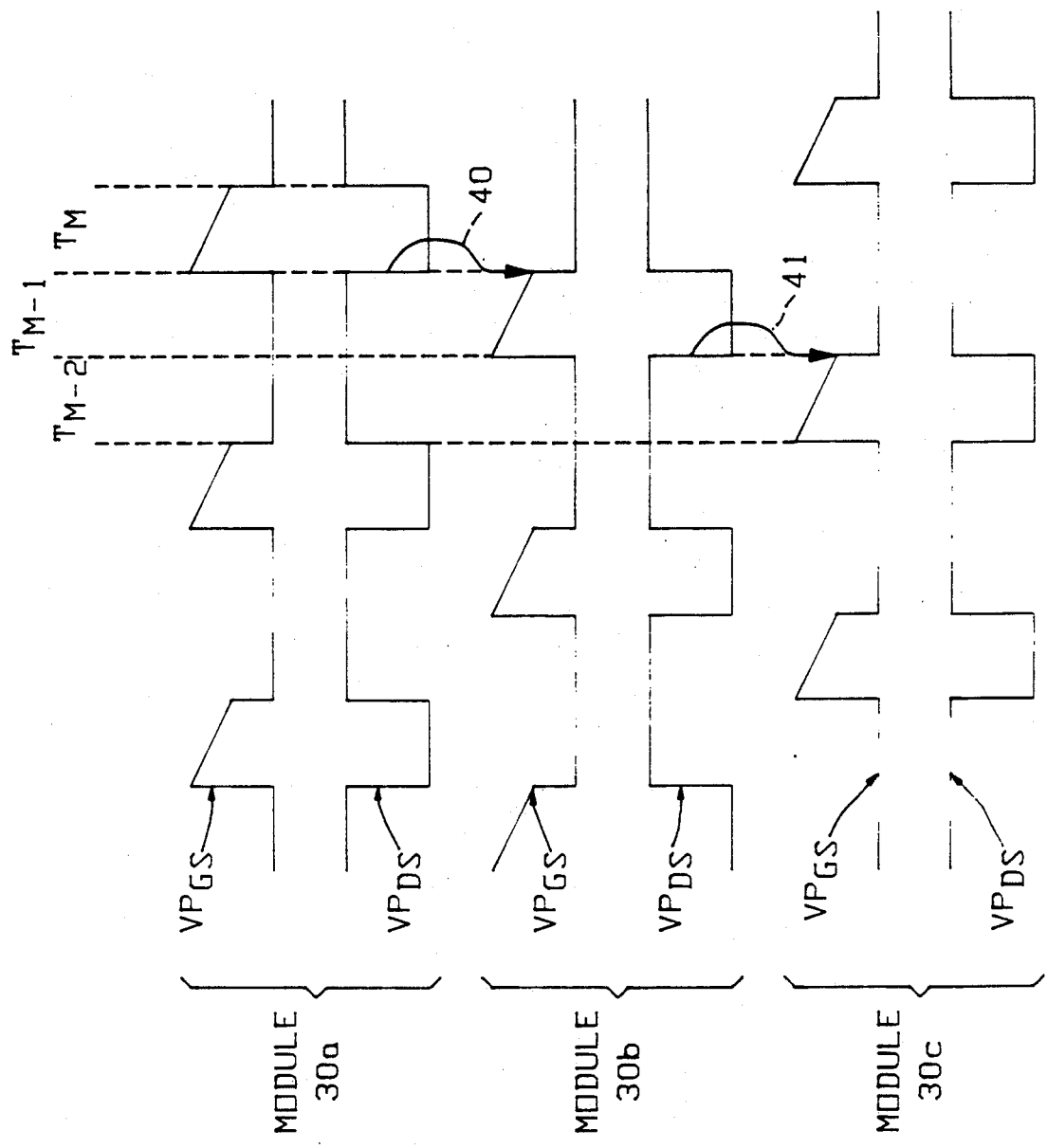

In the power converter systems of FIG's. 5A–5D, the cells 30a, 30b, and 30c operate in a phased relationship with each other. This occurs due to the serial coupling between the control-out terminals "e" and the control-in terminals "f". FIG. 6 illustrates this phased operation.

During a time period $t_M$ in FIG. 6, transistor $T_P$ of cell 30a is ON; during the immediately preceding time period $t_{M-1}$ transistor $T_P$ of cell 30b is ON; and during the immediately preceding time period $t_{M-2}$, transistor $T_P$ cell 30c is ON. This phased operation repeats over and over in a cyclic fashion.

Each of the time periods $t_M$, $t_{M-1}$, and $t_{M-2}$ are of equal length. In cell 30a, resistor P5 is selected such that the ON time of transistor $T_P$ equals time interval $t_M$, and resistor S5 is selected such that the ON time of transistor $T_S$ equals $2t_M$. In cell 30b, resistor P5 is selected such that the ON time of transistor $T_P$ is 1% to 5% larger then time interval $t_M$, and resistor S5 is selected such that the ON time of transistor $T_S$ equals $2t_M$. In cell 30c, resistor P5 is selected such that the ON time of transistor $T_P$ is 1% to 5% larger then time interval $t_M$, and resistor S5 is selected such that the ON time of transistor $T_S$ equals $2t_M$.

Also in cells 30a and 30b, capacitor P14 is made equal to 5% to 20% of the node capacitance on the gate of transistor $T_P$. Due to the coupling from one cell to another that is provided by capacitor P14, the falling edge of the drain to source voltage of transistor $T_P$ in one cell is synchronized to the falling edge of the gate to source voltage of transistor $T_P$ in the next succeeding cell. That is, the turn ON of transistor $T_P$ in one cell is synchronized to the turn OFF of transistor $T_P$ in the next succeeding cell. This is illustrated by transitions 40 and 41 in FIG. 6.

When transition 40 occurs, the drain to source voltage drop of transistor $T_P$ in cell 30a is coupled to the gate of transistor $T_P$ in cell 30b. Due to this coupling, the gate voltage of transistor $T_P$ in module 30b is stepped below its threshold voltage, and thus that transistor turns OFF.

Conversely, suppose the gate to source voltage of transistor $T_P$ in cell 30b reaches its threshold voltage before transistor $T_P$ in cell 30a turns ON. Such an event can only occur for a few cycles, because the ON-OFF cycle time of transistor $T_P$ in cell 30b is slightly larger then the ON-OFF cycle time of transistor $T_P$ in module 30a. Thus with each cycle, the time at which the gate to source voltage of transistor $T_P$ in cell 30b reaches its threshold is advanced, until it coincides with the turning ON of transistor $T_P$ in cell 30a.

Similarly, as transition 41 shows, the drain to source voltage drop of transistor $T_P$ in cell 30b is coupled to the gate of transistor $T_P$ in cell 30c. Due to that coupling, the gate voltage of transistor $T_P$ in cell 30c is forced below its threshold voltage; and so transistor $T_P$ in cell 30c turns OFF. Also, if the gate to source voltage of transistor $T_P$ in cell 30c reaches its threshold before transistor $T_P$ in cell 30b turns ON, then the turn OFF time of transistor $T_P$ in cell 30b will be advanced until it coincides with the ON time of transistor $T_P$ in cell 30c.

By operating the cells 30a, 30b, and 30c with the phased relationship of FIG. 6, ripple in the output voltage $V_o$ is reduced in comparison to a converter which charges the output capacitance during space apart time intervals. Consequently, the size and cost of the output capacitors $C_o$ is reduced.

Further, by converting an input voltage to an output voltage via a system of cell as shown in FIGS. 5A-5D, the power loss in any one component of the system is reduced in comparison to converter which is a single integrated unit. Consequently, no "hot spots" exist in the FIG. 5A-5D systems; and that further reduces cooling requirements and cooling costs.

In addition, when the input terminals and/or output terminals of several cells are coupled in series, the magnitude of the voltages which are switched by the transistors $T_P$ and $T_S$ are reduced in comparison to the voltages that would be switched by a single integrated power converter. Consequently, electro-magnetic noise that is produced by such switching is reduced in magnitude; and, that reduces shielding costs.

Also, by converting power via a system of the disclosed power cells, only single turn transformers are needed regardless of the input-output voltage requirements. This is in comparison to the variety of different multi-turn transformers that would be needed by a single integrated power converter. By this reduction in transformer types and complexity, manufacturing cost is further reduced.

Further, having only single turn transformers gives the physical structure of the cellular power system a planar profile when those cells are mounted on a printed circuit board. By comparison, a converter which incorporates multi-turn transformers inherently has a three dimensional profile.

Several preferred embodiments of the invention have now been described in detail. In addition however, many changes and modifications can be made to the above described details without departing from the nature and spirit of the invention. Accordingly, it is to be understood that the invention is not limited to the details of the preferred embodiments but is defined by the appended claims.

What is claimed is:

1. A power conversion cell having a pair of input terminals for receiving an input voltage, and a pair of output terminals for providing an output voltage which is derived from said input voltage; said cell further including:
   a primary single turn winding on a magnetic core and a primary transistor which are coupled in series between said input terminals;
   a secondary single turn winding on said core and a secondary transistor which are coupled in series between said output terminals;
   a primary control circuit means for turning said primary transistor ON and OFF in a cyclic fashion; and, a secondary control circuit means for turning said secondary transistor ON and OFF in a cyclic fashion;
   said primary control circuit means being magnetically coupled to said core and initiating each ON state of said primary transistor in response to a flux decrease in said core caused by said secondary transistor turning OFF; and,
   said secondary control circuit means being magnetically coupled to said core and initiating each ON state of said secondary transistor in response to a flux decrease in said core caused by said primary transistor turning OFF.

2. A cell according to claim 1 wherein to provide said magnetic coupling between said primary control circuit means and said core, said primary control circuit means includes a first single turn sensing winding on said core; and wherein to provide said magnetic coupling between said secondary control circuit means and said core, said secondary control circuit means includes a second single turn sensing winding on said core.

3. A cell according to claim 2 wherein said primary control circuit means includes a primary feedback circuit coupled to said first sensing winding which lowers the gate-source voltage of said primary transistor by a step when said primary transistor starts to turn OFF, and said secondary control circuit means includes a secondary feedback circuit coupled to said second sensing winding which lowers the gate-source voltage of said secondary transistor by a step when said secondary transistor starts to turn OFF.

4. A cell according to claim 2 wherein said primary control circuit means includes a primary delay means coupled to said first sensing winding which delays turning ON said primary transistor until a near zero voltage drop occurs across said primary transistor, and said secondary control circuit means includes a secondary delay means coupled to said second sensing winding which delays turning ON said secondary transistor until a near zero voltage drop occurs across said secondary transistor.

5. A cell according to claim 1 wherein said primary control circuit includes a primary timing means which keeps said primary transistor in its ON state for a time period of less then one and one-half microsecond, and said secondary control circuit includes a secondary timing means which keeps said secondary transistor in its ON state for a time period of less then one and one-half microsecond.

6. A cell according to claim 5 wherein said core has a cross-sectional area which is small enough to saturate if each ON time period is extended to two microseconds.

7. A cell according to claim 5 wherein said primary timing means and secondary timing means include respective capacitors which discharge through respective resistors at a rate that sets the time period of the ON state.

8. A cell according to claim 1 wherein said primary control circuit further includes a control-out terminal on which a control voltage of a certain level is generated when said primary transistor is ON, and a control-in terminal which inhibits said primary transistor from turning ON when a voltage of said certain level is applied thereto by another cell.

9. A series of cells, each of which is configured according to claim 8; each cell having its control-out terminal coupled to the control-in terminal of the next cell in said series; and, all of said cells having their input terminals coupled in series and their output terminals coupled in parallel.

10. A series of cells, each of which is configured according to claim 8; each cell having its control-out terminal coupled to the control-in terminal of the next cell in said series; and, all of said cells having their input terminals coupled in parallel and their output terminals coupled in series.

11. A series of cells, each of which is configured according to claim 8; each cell having its control-out terminal coupled to the control-in terminal of the next cell in said series; and, all of said cells having their input terminals coupled in series and their output terminals coupled in series.

12. A series of cells, each of which is configured according to claim 8; each cell having its control-out terminal coupled to the control-in terminal of the next cell in said series; and, all of said cells having their input terminals coupled in parallel and their output terminals coupled in parallel.

13. A power conversion cell having a pair of input terminals for receiving an input voltage, and a pair of output terminals for providing an output voltage which is derived from said input voltage; and cell further including: a magnetic core having a primary winding and a secondary windings respectively coupled to said input terminals and said output terminals; a primary switching means in series with said primary winding and a secondary switching means in series with said secondary winding; a primary control circuit means magnetically coupled to said core for initiating ON states in said primary switching means in response to a flux decrease in said core caused by said secondary switching means turning OFF; and, a said secondary control circuit means magnetically coupled to said core for initiating ON states in said secondary switching means in response to a flux decrease in said core caused by said primary switching means turning OFF.

* * * * *